Figure 1:
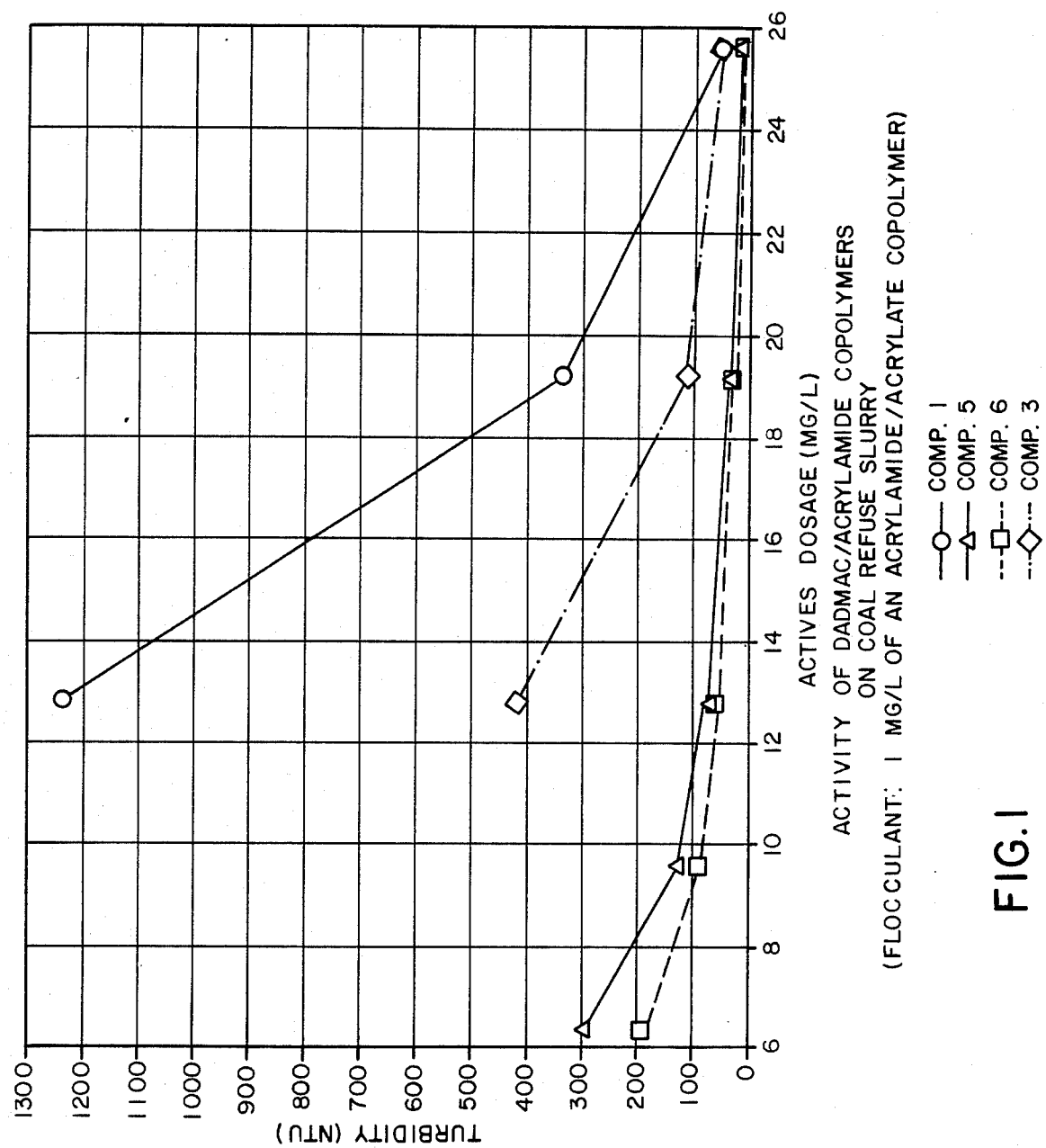

United States Patent [19]

Richardson et al.

[11] Patent Number: 4,673,511

[45] Date of Patent: Jun. 16, 1987

[54] ACRYLAMIDE DIALLYL DIMETHYL AMMONIUM CHLORIDE COPOLYMERS AS IMPROVED DEWATERING ACIDS FOR MINERAL PROCESSING

[75] Inventors: Paul F. Richardson, Glen Ellyn; Bhupati R. Bhattacharyya, Downers Grove, both of Ill.

[73] Assignee: Nalco Chemical Company, Oak Brook, Ill.

[21] Appl. No.: 781,614

[22] Filed: Sep. 30, 1985

[51] Int. Cl.$^4$ ................................................ C02F 1/56
[52] U.S. Cl. .................................... 210/734; 210/735
[58] Field of Search ...................... 210/734, 735, 736

[56] References Cited

U.S. PATENT DOCUMENTS

| | | |
|---|---|---|
| 3,171,805 | 3/1965 | Suen et al. . |
| 3,288,770 | 11/1966 | Butler . |
| 3,409,547 | 11/1968 | Dajani ................................. 210/735 |
| 3,461,163 | 8/1969 | Boothe ........................... 210/735 X |
| 4,077,930 | 3/1978 | Lim et al. ....................... 210/735 X |
| 4,141,691 | 2/1979 | Antonetti et al. .............. 210/735 X |
| 4,439,580 | 3/1984 | Schaper . |

Primary Examiner—Tom Wyse
Attorney, Agent, or Firm—John G. Premo; Donald G. Epple

[57] ABSTRACT

An improved method of dewatering mineral slurries which comprises treating said slurries with a dewatering amount of a copolymer of acrylamide and DADMAC, which polymers are characterized as containing from 3–50 mole percent of acrylamide and having a Reduced Specific Viscosity of at least 2.

3 Claims, 3 Drawing Figures

ACTIVITY OF DADMAC/ACRYLAMIDE COPOLYMERS
ON COAL REFUSE SLURRY
(FLOCCULANT: 1 MG/L OF AN ACRYLAMIDE/ACRYLATE COPOLYMER)

—O— COMP. 1
—△— COMP. 5
--□-- COMP. 6
—◇— COMP. 3

ACRYLAMIDE DIALLYL DIMETHYL AMMONIUM CHLORIDE COPOLYMERS AS IMPROVED DEWATERING ACIDS FOR MINERAL PROCESSING

INTRODUCTION

The most commonly used coagulant in mining and mineral processing for solids removal and dewatering (hereafter collectively referred to as "dewatering") is the homopolymer of diallyl dimethyl ammonium chloride (DADMAC). DADMAC polymers have been used to treat a variety of mineral slurries including but not limited to coal, taconite, trona, sand and gravel slurries, and titania.

Conventionally the DADMAC polymers used in the above dewatering operations have a Reduced Specific Viscosity (RSV) less than 1. Typically DADMAC polymers used to dewater slurries of the above type have a RSV within the range of about 0.3–1.0.

If it were possible to find an improved cationic dewatering aid for slurries of the above type, an advance in the art would be made.

THE INVENTION

An improved method of dewatering mineral slurries which comprises treating said slurries with a dewatering amount of a copolymer of acrylamide and DADMAC, which polymers are characterized as containing from 3–50 mole percent of acrylamide and having a Reduced Specific Viscosity of at least 2. The RSV's reported herein were measured on 0.05% polymer solutions in 1N sodium nitrate at a pH of 4.

The acrylamide DADMAC polymers, as indicated above, have an RSV of at least 2. Typically, the RSV is within the range of 2–6 although copolymers having higher RSV's give improved performances over copolymers having lower RSV's.

Preparation of 75/25 mole % DADMAC/AcAm

Aqueous:
 75% DADMAC—523.3 grams
 46.4% AcAm[1]—124.0 grams
 DI $H_2O$—71.6 grams
 Versene—0.2 grams
 Sodium Formate—0.2 grams
Oil:
 LOPS—260.0 grams
 Sorbitan monooleate—7.0 grams
 Sorbitan monostearate reacted with 4 moles EO—7.0 grams
 Substituted oxazoline surfactant—6.0 grams
Initiator:
 Free radical catalyst—1.0 grams
Temperature:
 50° C. for 1 hour
 60° C. for 2 hours
 75° C. for 5 hours
45% initial solids
pH-5
39.1% solids
 10 ppm AcAm in 2% solution
 99.1% reacted
[1]AcAm=Acrylamide The amount of copolymer used to treat the slurries will vary based upon the nature of the slurry, the RSV of the copolymer, and other conditions. As a general rule, however, the dosage of active polymer will vary between 0.01–50 ppm based on the weight of the slurry treated with a preferred dosage level being 0.1–25 ppm.

In order to illustrate the advantages of the invention, the following examples are presented:

EXAMPLE 1

Coal Refuse

Figure 2:
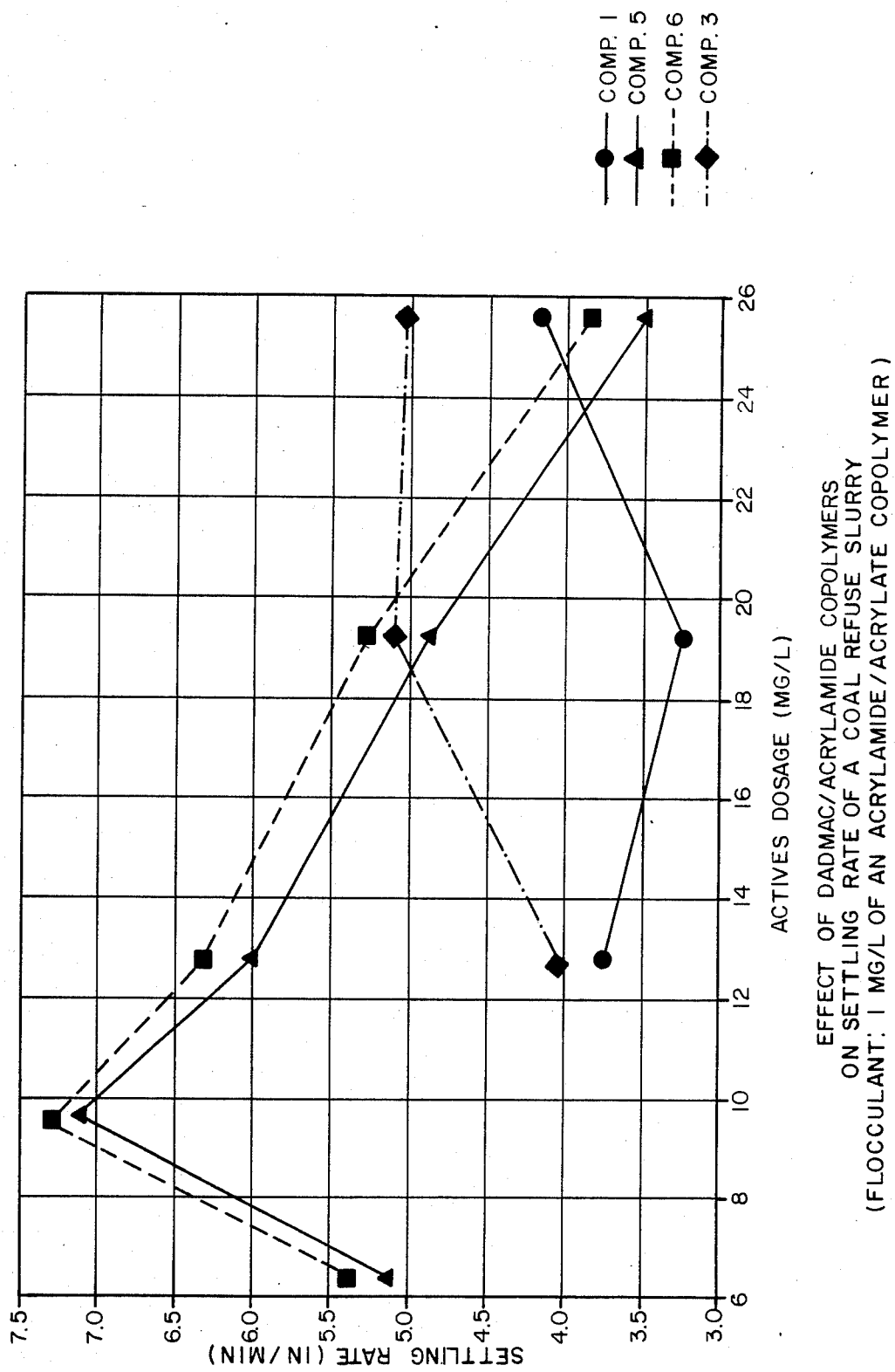

A series of DADMAC/Acrylamide copolymers were investigated as possible coagulants for coal refuse slurries obtained from commercial sources. The characteristics of the polymers tested are listed in Table I. The results of cylinder tests are given in Table II. FIG. 1 shows typical turbidity dosage curves obtained from cylinder tests for three of the copolymers and homopolymer DADMAC. Clearly, all the copolymers produce clearer water at dosages less than that required of homopolymer DADMAC. In addition, the copolymers provide the benefit of faster settling rates. This is illustrated in FIG. 2 which shows the settling rate versus dose for the same experiments used to generate FIG. 1.

At dosages given comparable clarity, settling rates were significantly faster with the copolymers as compared to homopolymer DADMAC.

Cylinder Test

The slurry is split into 500 cc glass mixing cylinders. The cyclinders are inverted several times to mix the slurry. The coagulant is added and the cylinder inverted four times. For coal refuse, flocculant is then added and the cylinder inverted an additional four times. The distance the solids setttle is noted at regular intervals. The clarity of the resulting supernatant is measured five minutes after the start of the test.

TABLE I

| CHARACTERISTICS OF COAGULANTS TESTED | | |
|---|---|---|
| Sample | Mol. % DADMAC | RSV |
| Comp. 1 | 100.0 | 0.7 |
| Comp. 2 | 93.4 | 2.3 |
| Comp. 3 | 83.5 | 3.3 |
| Comp. 4 | 80.0 | 6.5 |
| Comp. 5 | 71.4 | 5.2 |
| Comp. 6 | 61.6 | 6.6 |

TABLE II

RESULTS OF CYLINDER TESTS USING EXPERIMENTAL COAGULANTS ON COMMERCIAL COAL REFUSE SLURRIES

| | Replacement Ratio* | | |
|---|---|---|---|
| Sample | Slurry 1 | Slurry 2 | Slurry 3 |
| Comp. 1 | 1.00 | 1.00 | 1.00 |
| Comp. 2 | 0.76 | 0.79 | 0.82 |
| Comp. 3 | 0.74 | 0.81 | 0.78 |
| Comp. 4 | 0.77 | 0.85 | 0.51 |
| Comp. 5 | 0.65 | 0.54 | 0.37 |
| Comp. 6 | 0.59 | 0.46 | 0.37 |

*Defined as $\frac{\text{Dose Sample}}{\text{Dose Comp. 1}}$ needed to obtain a clarity of 200 NTU (Nelson Turbidity Units). The smaller the replacement ratio value, the more active the polymer tested. All replacement ratios were calculated on an actives (polymer) basis.

EXAMPLE 2

Coal Refuse

A series of copolymers were synthesized further varying the amount of DADMAC in the polymer. These polymers were then tested on two commercial coal refuse slurries. The characteristics of these polymers and the results obtained from cylinder tests are given in Table III. As these data show, the DADMAC-/Acrylamide copolymers show good activity over a wide range of compositions, although as the amount of DADMAC decreases to 35%, activity starts to decrease.

TABLE III

CHARACTERISTICS AND RELATIVE ACTIVITY OF DADMAC/ACRYLAMIDE COPOLYMERS

| Sample | Mol. % DADMAC | RSV | Replacement Ratio | |
|---|---|---|---|---|
| | | | Slurry 4 | Slurry 5 |
| Comp. 1 | 100 | 0.7 | 1.00 | 1.00 |
| Comp. 7 | 76.9 | 4.4 | 0.78 | 0.31 |
| Comp. 8 | 65.5 | 5.2 | — | 0.51 |
| Comp. 9 | 54.3 | 5.6 | 0.59 | — |
| Comp. 10 | 34.6 | 9.2 | 0.75 | 0.86 |

EXAMPLE 3

Taconite Tails

Figure 3:
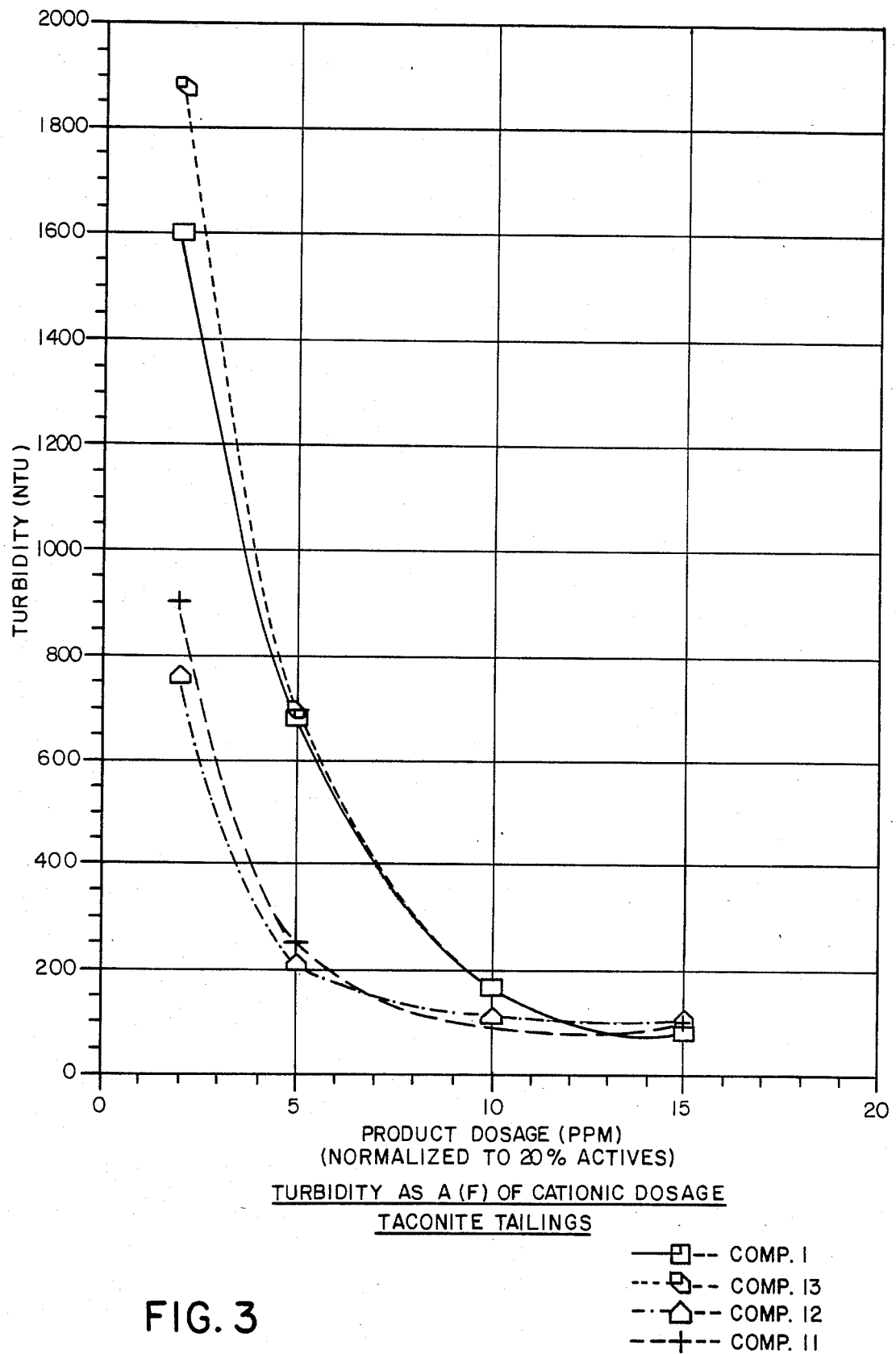

Two DADMAC/Acrylamide copolymers were tested on taconite tails from commercial sources. In addition, a mixture of homopolymer DADMAC with homopolymer acrylamide acrylamide was tested. The characteristics of the polymers tested are given in Table IV. The turbidities obtained from cylinder tests are plotted versus dose in FIG. 3. The copolymers are more active than either homopolymer DADMAC or the blend of acrylamide and DADMAC. The results obtained from cylinder tests on the slurries are presented in Table V. Note that the copolymers result in significantly faster settling rates at equivalent dosages.

TABLE IV

CHARACTERISTICS OF POLYMERS TESTED ON TACONITE TAILS

| Sample | Mol. % DADMAC | RSV |
|---|---|---|
| Comp. 1 | 100 | 0.7 |
| Comp. 11 | 80 | 2.9 |
| Comp. 12 | 80 | 5.0 |
| Comp. 13 | 80* | — |

*Mixture, not a copolymer.

TABLE V

RESULTS OF CYLINDER TESTS USING EXPERIMENTAL COAGULANTS ON TACONITE TAILS

| Sample | Dosage (ppm) | Settling Rate (in/min.) | Turbidity (JTU) | Replacement Ratio* |
|---|---|---|---|---|
| Comp. 1 | 2 | 8 | 1600 | 1.0 |
| Comp. 1 | 5 | 8.6 | 675 | |
| Comp. 1 | 10 | 11.4 | 155 | |
| Comp. 1 | 15 | 12.4 | 66 | |
| Comp. 13 | 2 | 9.8 | 1800 | 1.0 |
| Comp. 13 | 5 | 9.4 | 690 | |
| Comp. 13 | 10 | 11.2 | 150 | |
| Comp. 13 | 15 | 11.5 | 75.5 | |
| Comp. 12 | 2 | 10.7 | 760 | 0.54 |
| Comp. 12 | 5 | 12.5 | 209 | |
| Comp. 12 | 10 | 17.0 | 100 | |
| Comp. 12 | 15 | 21 | 89 | |
| Comp. 11 | 2 | 10 | 900 | 0.63 |
| Comp. 11 | 5 | 11.6 | 243 | |
| Comp. 11 | 10 | 16 | 74 | |
| Comp. 11 | 15 | 18.9 | 80 | |

*Calculated at 200 NTU (Nelson Turbidity Units) using Comp. 1 as a standard. The smaller the replacement ratio value, the more active the polymer tested.

We claim:
1. An improved method of dewatering mineral slurries which comprises treating said slurries with a dewatering amount of a copolymer of acrylamide and DADMAC, which polymers are characterized as containing from 3-50 mole percent of acrylamide and having a Reduced Specific Viscosity of at least 2.
2. The method of claim 1 where the mineral slurry is a taconite slurry.
3. The method of claim 1 where the mineral slurry is a coal slurry.

* * * * *